US006112404A

United States Patent [19]

Tarpill

[11] Patent Number: 6,112,404

[45] **Date of Patent: *Sep. 5, 2000**

[54] RADIAL TAPER TOOL FOR COMPRESSING ELECTRICAL CONNECTORS

[75] Inventor: Andrew J. Tarpill, East Haddam, Conn.

[73] Assignee: Capewell Components Company, LLC, Cromwell, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/111,231

[22] Filed: Jul. 7, 1998

[51] Int. Cl.$^{7}$ .......................... B23P 19/00; H01R 43/042

[52] U.S. Cl. ................................ 29/751; 29/753; 29/758; 29/268; 29/828; 29/861; 29/863; 72/409.01; 72/409.14; 72/416

[58] Field of Search ............................ 29/751, 268, 754, 29/828, 861, 753, 758, 252, 863; 72/409.06, 409.01, 409.14, 409.19, 413, 416, 409.11

[56] References Cited

U.S. PATENT DOCUMENTS

| | | | |
|---|---|---|---|
| 2,333,120 | 11/1943 | Parker | 29/84 |
| 2,852,841 | 9/1958 | Ballard et al. | 29/508 |
| 3,094,774 | 6/1963 | Nazarow et al. | 29/203 |
| 3,757,408 | 9/1973 | Shemtov | 29/237 |
| 3,793,693 | 2/1974 | Levak | 29/203 |
| 4,136,549 | 1/1979 | Lytle et al. | 72/453.16 |
| 4,345,361 | 8/1982 | Baumann | 29/237 |
| 4,483,056 | 11/1984 | Schwalm et al. | 29/237 |
| 4,509,244 | 4/1985 | Houck et al. | 29/516 |
| 4,559,691 | 12/1985 | Mannhart et al. | 29/283.5 |
| 4,794,780 | 1/1989 | Battenfeld | 72/410 |
| 4,932,091 | 6/1990 | Krzyzanski | 7/107 |
| 5,040,288 | 8/1991 | Nilsson | 29/751 |
| 5,105,648 | 4/1992 | Steiner et al. | 72/410 |
| 5,113,474 | 5/1992 | Slaney et al. | 385/136 |
| 5,138,864 | 8/1992 | Tarpill | 72/410 |
| 5,392,508 | 2/1995 | Holliday et al. | 29/751 |
| 5,520,040 | 5/1996 | Pettersson | 72/409.08 |
| 5,546,653 | 8/1996 | Tournier et al. | 29/751 |
| 5,596,800 | 1/1997 | Holliday et al. | 29/751 |
| 5,647,119 | 7/1997 | Bourbeau et al. | 29/571 |
| 5,743,131 | 4/1998 | Holliday et al. | 72/409.1 |
| 5,806,168 | 9/1998 | Wurst et al. | 29/566.4 |
| 5,842,371 | 12/1998 | Liaw | 72/409.12 |
| 5,845,393 | 12/1998 | DePaiva | 29/751 |

FOREIGN PATENT DOCUMENTS 24 29 280 6/1974 Germany .

OTHER PUBLICATIONS

Augat Communications Division LRC Product, Installation & Product Data Handbook; LRC Electronics, Inc. Box 111, Horseheads, NY 14845,Jun. 1992,5M; pp. 1–123 plus cover page, Jun. 1992.

*Primary Examiner*—Jessica J. Harrison
*Assistant Examiner*—Binh-An Nguyen
*Attorney, Agent, or Firm*—DeLio & Peterson, LLC

[57] ABSTRACT

A tool for attaching a connector to an end of a cable by compressing the connector axially and driving it into a tapered cavity uses a light rigid O-frame. The tapered cavity is formed in a pair of die halves which are both pivoted to the frame and which are provided with oppositely mounted handles, allowing the dies to be opened by squeezing the handles together. Two different adjustment means are provided and the tool is provided with a full-cycle ratchet mechanism to ensure complete compression of the connector during each use.

27 Claims, 1 Drawing Sheet

RADIAL TAPER TOOL FOR COMPRESSING ELECTRICAL CONNECTORS

BACKGROUND OF THE INVENTION

1. Field of the Invention

This invention relates to tools for attaching connectors to coaxial cables. More specifically, this invention relates to tools which deform a thin-walled portion of the connector into a uniform circumferential seal around the cable by driving the connector in a direction parallel to the axis of the cable into a conically tapered cavity in a die to produce a radially tapered crimp.

2. Description of Related Art

A common type of electrical connector used on coaxial cables includes a thin-walled cylindrical portion at the end of the connector which receives the cable. The coaxial cable is prepared by removing insulation and exposing the inner conductor and the outer conductive braid. The prepared cable is then inserted into the thin-walled cylindrical portion at the back end of the connector, and the thin-walled portion is radially compressed around the cable with a hand tool.

The compression operation simultaneously connects the outer connector housing to the outer conductive braid, and mechanically connects the connector to the cable. Connectors of this type are widely used in the cable industry for connecting coaxial cables that carry video signals.

A variety of hand tools have been designed to compress the thin-walled cylindrical portion of the connector. Some tools apply the compression force directly inward, transverse to the axis of the cable and radially inward from opposite sides of the connector. However, an alternative design for a compression tool applies the compression force longitudinally, i.e., along the axis of the cable and connector. The axially directed force is applied to the front of the connector which drives the thin-walled portion at the back end of the connector into a conically tapered die. The cone-shape of the die converts the axial or longitudinal force into a radial force and swages the thin-walled portion into a relatively uniform and smoothly tapered compression fit between the connector and the cable.

One problem with this type of design has been the difficulty of extracting the connector from the tapered die after the compression cycle. In prior art tools of the type shown in U.S. Pat. No. 5,392,508, only one half of the tapered die is movable, and the other half of the die is rigidly attached to the tool. In this type of design, the compressed connector can be so deeply forced into the die that it locks the two die halves together, making it difficult to open them. Because only one half of the die is moveable, the moveable half must move longitudinally a short distance relative to the other half before it swings away to open the die. This relative longitudinal/axial motion between the two die halves is resisted by the connector which is in firm contact with both die halves after the compression cycle.

Another problem with prior art tools is the failure of the tool to hold the thin-walled portion of the connector in alignment with, and squarely perpendicular to, the plunger portion of the tool which provides the compression force. When correct alignment is not maintained, the connector will not be compressed properly, and may jam in the tapered cavity. At the same time, it is desirable to keep the hand tool light in weight and inexpensive to manufacture.

Heretofore, compression tools of this type, as exemplified in U.S. Pat. No. 5,392,508, have all used a C-shaped frame. The C-frame has a back portion which must rigidly hold two projecting arms in accurate and parallel alignment during the compression operation. The two arms In a C-frame design define a compression region between them within which the connector is positioned. A plunger projects into the compression region through one arm of the C-frame, and the connector is driven into the conically tapered cavity in the die which is supported by the opposing arm of the C-frame. The back portion of the C-frame is relied upon and must be strong enough to hold the two arms parallel to each other throughout the compression operation.

In order to keep the front of the connector square relative to the die cavity, the back and two arms of the C-frame must be relatively large and strong, making them heavy. It is particularly difficult to keep the back straight and still keep the frame light, because the back portion of a C-frame is under a relatively high bending moment and is partially in compression and partially in tension. If the back and arms of the C-frame are not sufficiently stiff, the frame will distort as the compression forces are applied. Such distortion lets the two arms of the C-frame move away from parallel resulting in an improperly compressed connector that may fail, or which may jam in the die. Making the C-frame stiffer usually requires more weight which adds cost and is undesirable for the user who may have to lift and carry the tool tens of thousands of times during its life.

The present invention addresses the problem of maintaining tool alignment during compression through the use of an O-frame which permits a reduction in weight and materials cost, while improving tool rigidity. By improving tool rigidity, the problem of connector jamming is also reduced. To make the compressed connector easier to remove and for the occasional jammed connector that results in all such designs, the tool is designed with two identical pivoted die halves. By pivoting both die halves the die is much easier to open, even when a misaligned connector has been jammed into the die. By making the die halves identical, tool cost is reduced.

The jamming problem has also been made easier to deal with, and tool operation speed increased, by attaching die handles to the die halves. The die handles point forward and are arranged in close parallel proximity to each other so that they can be quickly squeezed together to open the die and allow the connector to be removed.

A further problem with prior art tool designs has been the "full-cycle" ratchet mechanism. A full-cycle ratchet mechanism forces the tool to progress through a complete compression cycle before the handles of the tool can be opened. This is advantageous for ensuring that a full stroke is applied to the tool handles to fully complete each compression operation, but it creates a problem when the tool operator discovers that a connector is misaligned and is about to jam in the die cavity. Prior art tools, such as the type shown in U.S. Pat. No. 5,743,131, have required a tool, such as a screwdriver, to release the full-cycle ratchet mechanism before the compression cycle is complete. This is inconvenient, and may tempt the operator to try to complete the compression cycle, jamming the connector more deeply and worsening the problem. The present invention addresses this problem with a hand-operable release for the full-cycle ratchet mechanism.

Another problem with prior art tools has been the adjustment mechanism. To ensure a perfectly compressed connector, the distance between the plunger and the tapered die cavity must be carefully controlled. Tool wear causes this distance to change. Prior art tools have provided a single adjustment to the plunger to compensate for such wear, but the adjustment is difficult. The present invention provides two separate adjustments, one coarse adjustment and one fine adjustment that allows the operator to quickly make fine or coarse adjustments to the tool.

Yet another problem with prior art devices relates to the interconnection between the handle providing the compression force and the plunger performing the compression. Typically, as the handles are opened, the plunger is pulled towards the retracted position by a link. Some prior art designs have locked into the open position when the handles open too far and the link passes over center. The present invention addresses this difficulty with an enlarged plunger head which limits rearward motion of the plunger.

Bearing in mind the problems and deficiencies of the prior art, it is therefore an object of the present invention to provide a radial taper tool which is light in weight, has low material cost, and is not subject to distortion during the compression operation.

Another object of the present invention to provide a radial taper tool which resists jamming.

Yet another object of the present invention to provide a radial taper tool with a full-cycle ratchet mechanism that is rugged and yet is easy to release prematurely, without tools, when desired.

It is another object of the present invention to provide a radial taper tool which allows the cable and compressed connector to be easily and quickly removed from the tool after the connector is compressed.

A further object of the present invention is to provide a design which can be easily adjusted to high accuracy.

SUMMARY OF THE INVENTION

The above and other objects and advantages, which will be apparent to those skilled in the art, are achieved in the present invention which is directed to, in a first aspect, a radial taper tool for attaching a connector to an end of a cable including a body having an O-frame defining a compression region for receiving the end of the cable and the connector. A lever handle is pivotally attached to the body and a plunger is mounted for longitudinal sliding motion relative to the body. The plunger has a first end extending into the compression region and a second end driven by the lever handle. The lever handle drives the plunger longitudinally between an extended position and a retracted position. In the extended position, the plunger drives the connector into a tapered cavity in a die formed from a pair of die halves mounted to the body. The tapered cavity is axially aligned with the plunger and conically compresses the connector as the plunger is moved to the extended position. The die is openable to release the connector from the tapered cavity after the connector is compressed.

In the preferred design, each die half is pivotally attached to the body for motion between a closed position and an open position and the die halves are pivotally attached to the body on a corresponding pair of die pivots. Die supports are provided corresponding to the die halves. The die supports prevent further rotation of the die halves about the die pivots when the die halves are in the closed position.

In the preferred aspect, the die cavity is substantially entirely on one side of a plane defined by the die pivots. To provide maximum frame rigidity and minimum weight, the frame is formed of first and second opposed O-frame sidewalls which define four support legs surrounding the compression region. The support legs carry loads substantially entirely in tension during compression of a connector. In the most highly preferred arrangement, the support legs are located substantially symmetrically around the plunger.

In another aspect of the invention the plunger includes a plunger tip having threads engaged in the plunger. The plunger tip is longitudinally adjustable by rotation relative to the plunger. A wrench socket is provided at the plunger tip which allows the plunger tip to be rotated by a wrench for adjustment and provides clearance for a projecting center conductor from the connector to be attached to the cable.

In this embodiment, it is preferred for the tool to include a locking screw and a locking pad for locking the plunger tip. The locking screw is threadedly engaged into the plunger transversely to the plunger tip and the locking pad is located between the locking screw and the threads of the plunger tip. The locking pad is formed of a resilient material for gripping and protecting the threads of the plunger tip when the locking screw is tightened.

In another aspect of the invention each die half includes a die handle for pivoting the die half around its corresponding die pivot towards the open position. In this aspect, each die handle is located on an opposite side of the die pivot from the tapered cavity such that the dies pivot towards the open position when the die handles are squeezed towards each other. The die handles preferably are located at an end of the tool and project longitudinally forward and away from the compression region.

In another aspect, the plunger includes an enlarged plunger head for restricting retracted motion of the plunger.

In yet another aspect, the tool includes a ratchet and a pawl forming a full-cycle ratchet mechanism mounted to the body. The ratchet mechanism is operably connected to control longitudinal travel of the plunger between the fully extended and fully retracted positions. The pawl includes a release end which allows the pawl to be disengaged from the ratchet without special tools at any point between the fully extended and the fully retracted positions.

In another aspect of the invention, the tool includes two different adjustment means for adjusting the distance between the plunger and the die halves.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–3 of the drawings in which like numerals refer to like features of the invention.

Figure 1:
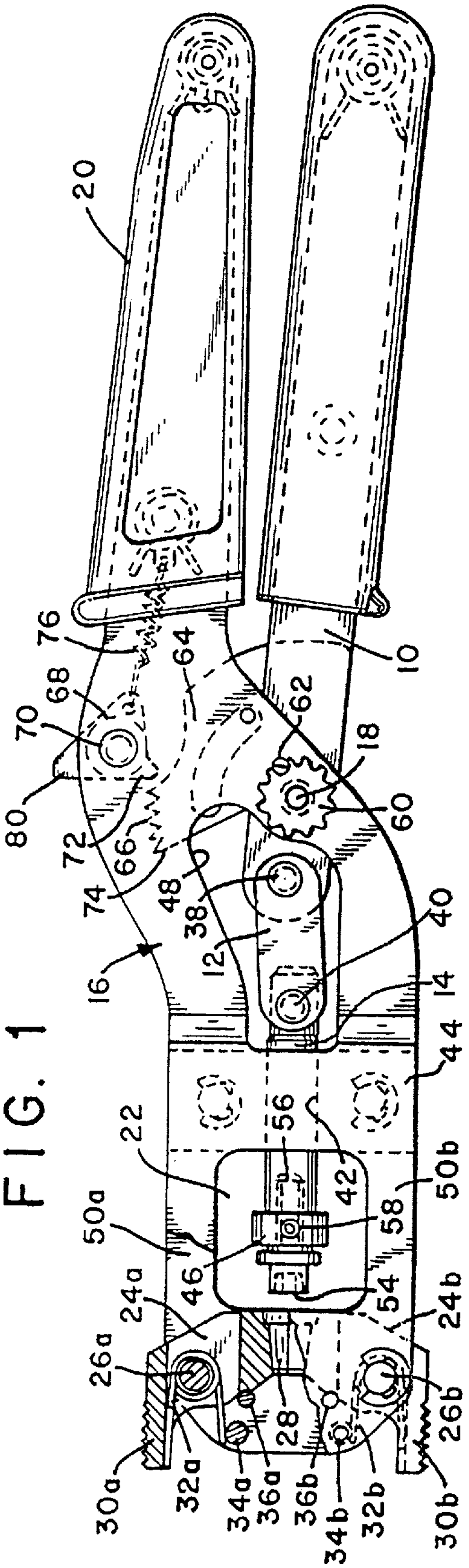
FIG. 1 is a side elevational view of the radial taper tool of the present invention, partly shown in section.
Figure 2:
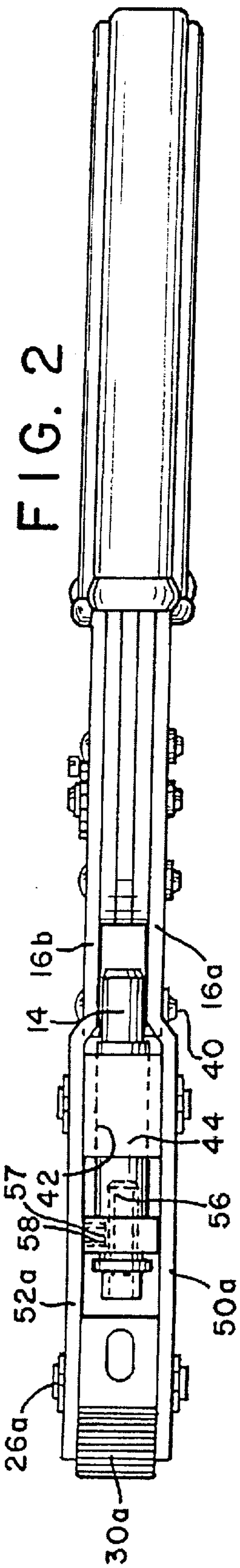
FIG. 2 is a top elevational view of the radial taper tool of the present invention.

Referring to FIG. 1, the radial taper tool of the present invention comprises a lever handle 10 connected to a link 12 driving a plunger 14. The lever handle 10 is pivotally attached to an O-frame body 16 via pivot 18. O-frame body 16 is formed of a pair of opposed O-frame sidewalls 16*a*, 16*b* (see FIG. 2), and pivot 18 is mounted between them.

A body handle 20 is fixed relative to the body 16. The "O" in the O-frame body 16 defines a compression region 22 into which the connector and cable is inserted by opening die halves 24*a* and 24*b* (see FIG. 3). The die halves 24*a*, 24*b* are pivoted around corresponding die pivots 26*a*, 26*b* which extend between the two opposed O-frame sidewalls 16*a*, 16*b*. The die halves 24*a*, 24*b* are provided with a tapered cavity 28 that is axially aligned with the plunger 14 when the die halves are in the closed position as illustrated in FIG. 1.

Figure 3:
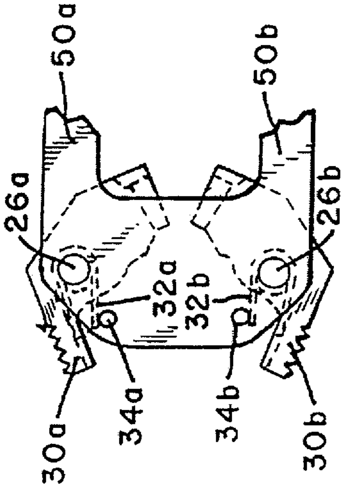
FIG. 3 is a partial side elevational view of the front end of the radial taper tool in FIG. 1 showing the die halves partially open.

The die halves may be pivoted around their corresponding die pivots 26*a*, 26*b*, by pressing die handles 30*a*, 30*b* towards each other as shown in FIG. 3. The die halves are held in the closed position of FIG. 1 by torsion springs 32*a*, 32*b* which surround the die pivot and act between a corresponding spacer 34*a* or 34*b* and the corresponding die half.

The die handles 30*a*, 30*b* are located on the opposite side of the die pivot from the tapered cavity 28. The die handles are located at an end of the tool and project longitudinally forward and away from the compression region such that the dies pivot towards the open position when the die handles are squeezed towards each other.

The die halves are prevented from passing the fully closed position by their mating engagement and by die supports 36*a* and 36*b*. Die support 36*a* is preferably a pin which extends between the two opposed O-frame sidewalls 16*a*, 16*b*. The die half 24*a* contacts and stops against the die support 36*a* when it is fully closed, and the die support 36*a* aids die half 24*a* in accurately maintaining alignment when the connector is being compressed by the plunger into the die cavity 28. The die supports provide positive alignment of the axis of the tapered cavity with the centerline of the plunger 14 as needed for reliable crimping operation.

Die cavity 28 has its larger end opening towards the plunger 14. The diameter of the cavity at the larger end is slightly greater than the diameter of an uncompressed cylindrical thin-walled portion of a connector to be compressed. The smaller end of the cavity 28 is approximately the same diameter as a coaxial cable to which the connector is to be attached.

Because both die halves are pivoted, the die is much easier to open than prior art tools where only half of the die is pivoted. When a die half is in the closed position, the initial motion of the die as it moves towards the open position is entirely axial, parallel to the tool centerline. Only after the die half has moved part of the way in its arc around the die pivot, does the die half begin to swing radially away from the tool centerline. When only one die half is movable, the high friction between the connector and the two die halves acts to lock the movable die half to the immovable one.

In the present design, this locking action between the two die halves, which is caused by the friction between the compressed connector and the walls of the tapered cavity, does not prevent the two halves from moving axially, because both halves are free to move together, even though they may be temporarily locked together. As soon as both halves of the die have moved slightly in the axial direction, the rotation around their die pivots causes them to swing away from each other, freeing the compressed connector for removal.

To use the tool, the lever handle 10 is pivoted away from the handle 20. This draws the link 12 toward the rear of the tool. In the preferred design, link 12 is a pair of links on opposite sides of the lever handle and the plunger. As the link 12 moves to the rear, it draws plunger 14 to the rear as well. Link 12 is pivotally attached to the lever handle by pivot 38 and to the plunger 14 by pivot 40.

Plunger 14 slides longitudinally in axial alignment with the tapered cavity 28 through a bore 42 in center piece 44. As the lever handle 10 opens, link 12 moves away from axial alignment with the lever handle. If the handle were to open too far, the link could reach a point at which it could no longer drive the plunger longitudinally and the handle could not be closed. To prevent this, the plunger 14 is provided with an enlarged head 46 which stops against the center piece 44 before the critical angle is reached. Contact between the link and the body cutout 48, or other means may also be used to provide this function.

The O-frame design provides four support legs 50*a*, 50*b*, 52*a* and 52*b* which are symmetrically spaced around the compression region 22. During a compression cycle, each of these support legs is in tension. Because of this balanced design there is little or no bending moment attempting to distort the frame, and the support legs can be relatively light. This contrasts with prior art C-frame designs where the bending moment on the frame is high and the frame must be heavier to resist distortion.

To ensure that the distance between the plunger 14 and the tapered cavity 28 is correct, the plunger 14 is provided with an adjustable plunger tip 54 which is threadedly engaged via threads 56 into the end of plunger 14. The plunger tip 54 includes a central axially-extending Allen wrench socket which allows the plunger tip to be turned relative to the plunger for adjustment. A locking screw 58 allows the plunger tip 54 to be locked into position after the correct adjustment is reached. A locking pad 57 formed of a resilient material, such as plastic, is positioned in the threaded bore holding the locking screw 58—between the tip of the locking screw and the threads 56 of plunger tip 54. The locking pad allows locking screw 58 to exert sufficient force against threads 56 to prevent them from turning while also protecting them from damage.

The locking screw 58 is preferably an Allen screw adjustable by an Allen wrench, and plunger tip 54 is preferably adjustable by inserting an Allen wrench along its axis into the Allen head opening in the plunger tip. The plunger tip can then be rotated to adjust its position relative to the plunger 14. The Allen wrench socket in the tip also acts to provide clearance for the center conductor in the cable to which the connector is being attached.

A gage block (not shown) with an axially extending hole may be conveniently inserted between the plunger tip and the tapered cavity (or other reference surface on the die halves) to adjust the distance between the plunger and the die halves. To adjust the tool, locking screw 58 is loosened which decreases pressure on the locking pad located between the tip of locking screw 58 and the threads of the plunger tip 54. A gage block is inserted into the compression region between the die halves and the plunger, the die halves are allowed to close, and the handles are then closed.

With the gage block in position and the handles fully closed, an Allen wrench is inserted through the axial opening in the gage block and into the plunger tip 54. The plunger tip can then be rotated with the Allen wrench until the plunger tip is accurately flush against the gage block. Locking screw 58 is then tightened with the same Allen wrench.

The locking screw 58 is threaded into the enlarged head 46 in plunger 14. This enlarged head provides material for the threads holding locking screw 58, and also acts to prevent the plunger 14 from moving too far to the right in the retracted position, as described.

In addition to the adjustment method described above, the preferred embodiment of the tool is provided with a second adjustment means which allows for very fine adjustment. The second adjustment means replaces lever handle pivot 18 with an eccentric pivot pin. The ends of the pivot pin 18 are engaged in the opposed O-frame side walls and have a center which is offset from the body of the pivot pin about which the lever handle pivots.

The pivot pin is attached to a star wheel 60 which allows the pivot pin to be rotated about the center of the ends of the pivot pin which are held by the O-frame sidewalls. This rotation changes the position of body of the eccentric pivot which sets the axis of rotation of the lever handle relative to the tapered cavity. As the star wheel 60 is rotated, it provides fine adjustment of this position and varies the distance the plunger extends into the compression region. After adjustment, the star wheel is locked down by lock screw 62.

The preferred design of the tool is also provided with a full-cycle ratchet mechanism formed by segment gear 64 having ratchet teeth 66 and pawl 68 which pivots on pawl pivot 70. As the handles are opened, segment gear 64 rotates to the rear of the tool, contacting pawl 68 which rotates counterclockwise until its tip 72 engages ratchet teeth 66. In this position, the pawl tip 72 is pointing towards the rear of the tool, and it freely passes over ratchet teeth 66 until the tool handles are fully opened. The ratchets prevent the handle from moving towards the closed position until they have reached the fully open position at which point the pawl tip 72 drops off tooth 74 on the segment gear and spring 76 pivots the pawl back to the position seen in FIG. 1.

As the tool handles are moved towards the closed position during a compression cycle, the pawl tip again contacts tooth 74, but this time the pawl rotates clockwise and the tip 72 points generally forward. Again, spring 76 holds the pawl in contact with the ratchet teeth, but this time, with the pawl tip pointing approximately in the opposite direction, the handles are prevented from opening and are constrained to move towards the fully closed position. When the fully closed position is reached, pawl tip 72 drops off the tooth at the opposite end of the ratchet gear from tooth 74.

The ratchet mechanism constrains the tool to move through a full cycle from fully open to fully closed and ensures that each connector is fully crimped before it is removed from the tool. Occasionally, however, a connector may enter the tapered cavity at an angle, and the operator will not want to complete the compression cycle. To accommodate this situation, the pawl is provided with a release end 80 which is accessible at all times to pivot the pawl away from the ratchet teeth. This allows the pawl to be disengaged by hand at any time, without the necessity for any additional tool.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A tool for attaching a connector to an end of a cable, the tool receiving the connector when in an open position and attaching the connector to the cable when in a closed position, the tool comprising:

a body having an O-frame in the open and closed positions, the O-frame defining a compression region for receiving the end of the cable and the connector;

a lever handle pivotally attached to the body;

a plunger mounted for longitudinal sliding motion relative to the body, the plunger having a first end extending into the compression region and a second end driven by the lever handle, the lever handle longitudinally moving the plunger between an extended position and a retracted position; and a die formed from a pair of die halves mounted to the body, the die including a longitudinally tapered cavity axially aligned with the plunger for conically compressing the connector as the plunger is moved to the extended position, the die being openable to release the connector from the tapered cavity after the connector is compressed.

2. A tool for attaching a connector to an end of a cable according to claim 1 wherein each die half is pivotally attached to the body for motion between a closed position and an open position.

3. A tool for attaching a connector to an end of a cable according to claim 2 wherein the die halves are pivotally attached to the body on a corresponding pair of die pivots.

4. A tool for attaching a connector to an end of a cable according to claim 3 further including a pair of die supports corresponding to the die halves, the die supports being mounted to the body to prevent further rotation of the die halves about the die pivots when the die halves are in the closed position.

5. A tool for attaching a connector to an end of a cable according to claim 4 wherein the body includes first and second opposed O-frame sidewalls and the die supports comprise pins extending between the first and second O-frame sidewalls.

6. A tool for attaching a connector to an end of a cable according to claim 3 wherein the die cavity is substantially entirely on one side of a plane defined by the die pivots.

7. A tool for attaching a connector to an end of a cable according to claim 1 wherein the O-frame includes first and second opposed O-frame sidewalls and the die pivots extend between the first and second O-frame sidewalls.

8. A tool for attaching a connector to an end of a cable according to claim 7 wherein the first and second opposed O-frame sidewalls define four support legs surrounding the compression region, the support legs carrying loads substantially entirely in tension during compression of a connector.

9. A tool for attaching a connector to an end of a cable according to claim 8 wherein the support legs are located substantially symmetrically around the plunger.

10. A tool for attaching a connector to an end of a cable according to claim 1 wherein the plunger includes a plunger tip having threads engaged in the plunger, the plunger tip being longitudinally adjustable by rotation relative to the plunger.

11. A tool for attaching a connector to an end of a cable according to claim 10 wherein the plunger tip includes a wrench socket at its tip, the wrench socket allowing the plunger tip to be rotated by a wrench for adjustment and providing clearance for a projecting center conductor from the connector to be attached to the cable.

12. A tool for attaching a connector to an end of a cable according to claim 10 wherein the plunger includes a locking screw and a locking pad for locking the plunger tip, the locking screw being threadedly engaged into the plunger transversely to the plunger tip, the locking pad being located between the locking screw and the threads of the plunger tip and being formed of a resilient material for gripping and protecting the threads of the plunger tip when the locking screw is tightened.

13. A tool for attaching a connector to an end of a cable comprising:

a body having an O-frame defining a compression region for receiving the end of the cable and the connector;

a lever handle pivotally attached to the body;

a plunger mounted for longitudinal sliding motion relative to the body, the plunger having a first end extending into the compression region and a second end driven by the lever handle, the lever handle longitudinally moving the plunger between an extended position and a retracted position; and a die formed from a pair of die halves mounted to the body, the die including a tapered cavity axially aligned with the plunger for conically compressing the connector as the plunger is moved to the extended position, the die being openable to release the connector from the tapered cavity after the connector is compressed, and each die half including a die handle for pivoting the die half around its corresponding die pivot towards the open position.

14. A tool for attaching a connector to an end of a cable according to claim 13 wherein, each die handle is located on an opposite side of the die pivot from the tapered cavity such that the dies pivot towards the open position when the die handles are squeezed towards each other.

15. A tool for attaching a connector to an end of a cable according to claim 13 wherein the die handles are located at an end of the tool and project longitudinally forward and away from the compression region.

16. A tool for attaching a connector to an end of a cable according to claim 15 wherein the die handles are approximately parallel to one another.

17. A tool for attaching a connector to an end of a cable according to claim 1 further comprising a link connected between the lever handle and the plunger, the link having a first end pivotally connected to the lever handle and a second end pivotally connected to the plunger.

18. A tool for attaching a connector to an end of a cable according to claim 1 wherein the plunger includes an enlarged plunger head for restricting retracted motion of the plunger.

19. A tool for attaching a connector to an end of a cable according to claim 1 further including a ratchet and a pawl forming a ratchet mechanism mounted to the body and operably connected to control longitudinal travel of the plunger between the fully extended and fully retracted positions.

20. A tool for attaching a connector to an end of a cable according to claim 19 wherein the pawl includes a release end, the release end allowing the pawl to be pivoted away from the ratchet and to disengage from the ratchet at any point between the fully extended and the fully retracted positions.

21. A tool for attaching a connector to an end of a cable according to claim 19 wherein the ratchet mechanism is connected between the body and the lever handle to control travel of the lever handle relative to the body, the pawl engages the ratchet when the lever handle is between the fully extended and fully retracted positions, and the pawl disengages the ratchet when the lever handle is at the fully extended or the fully retracted position.

22. A tool for attaching a connector to an end of a cable according to claim 21 wherein the ratchet comprises a segment gear fixedly mounted to the lever handle, the pawl is rotatably mounted to the body and the ratchet mechanism further includes a spring connected between the pawl and the body.

23. A tool for attaching a connector to an end of a cable according to claim 1 further including at least one spring operably connected to a die for urging said die towards the closed position.

24. A tool for attaching a connector to an end of a cable according to claim 1 wherein the lever handle pivots on an eccentric pivot pin.

25. A tool for attaching a connector to an end of a cable according to claim 24 further including a star wheel and a lock screw, the star wheel being attached to the eccentric pivot pin, and the lock screw securing the rotational position of the star wheel and the eccentric pivot pin relative to the body.

26. A tool for attaching a connector to an end of a cable according to claim 1 further including two adjustment means for adjusting the distance between the plunger and the die halves.

27. A tool for attaching a connector to an end of a cable according to claim 1 wherein each die half is pivotally attached to the body for motion between a closed position and an open position, and wherein the two die halves are identical.

* * * * *